United States Patent
Watanabe et al.

(10) Patent No.: US 9,048,492 B2
(45) Date of Patent: Jun. 2, 2015

(54) NEGATIVE ELECTRODE ACTIVE MATERIAL FOR ELECTRIC DEVICE

(75) Inventors: Manabu Watanabe, Yokosuka (JP); Osamu Tanaka, Yokosuka (JP); Masao Yoshida, Zushi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/119,057

(22) PCT Filed: Mar. 7, 2012

(86) PCT No.: PCT/JP2012/055745
§ 371 (c)(1),
(2), (4) Date: Nov. 20, 2013

(87) PCT Pub. No.: WO2012/160854
PCT Pub. Date: Nov. 29, 2012

(65) Prior Publication Data
US 2014/0110628 A1   Apr. 24, 2014

(30) Foreign Application Priority Data

May 25, 2011   (JP) ................. 2011-116671

(51) Int. Cl.
*H01M 4/38*   (2006.01)
*H01M 4/42*   (2006.01)
*H01G 11/50*   (2013.01)
H01M 10/052   (2010.01)
H01M 4/134   (2010.01)
H01M 4/36   (2006.01)

(52) U.S. Cl.
CPC .............. *H01M 4/386* (2013.01); *H01M 4/38* (2013.01); *H01G 11/50* (2013.01); *H01M 4/42* (2013.01); H01M 10/052 (2013.01); H01M 4/134 (2013.01); H01M 4/364 (2013.01); Y02T 10/7022 (2013.01); Y02T 10/7011 (2013.01); Y02E 60/13 (2013.01)

(58) Field of Classification Search
CPC ......... H01M 4/386; H01M 3/38; H01M 4/42; Y02E 60/122
USPC ............. 252/182.1; 429/229, 231.5; 420/424, 420/578, 580
See application file for complete search history.

(56) References Cited

U.S. PATENT DOCUMENTS

| | | |
|---|---|---|
| 2004/0048160 A1 | 3/2004 | Omaru |
| 2009/0004566 A1 | 1/2009 | Shirane et al. |
| 2009/0011333 A1 | 1/2009 | Wakita et al. |
| 2010/0037951 A1 | 2/2010 | Borland et al. |
| 2010/0099029 A1 | 4/2010 | Kinoshita et al. |

FOREIGN PATENT DOCUMENTS

| | | |
|---|---|---|
| JP | 2004-103476 A | 4/2004 |
| JP | 2005-78999 A | 3/2005 |
| JP | 2005-158305 A | 6/2005 |
| JP | 2006-216277 A | 8/2006 |
| JP | 2009-16245 A | 1/2009 |
| JP | 2010-97843 A | 4/2010 |
| TW | 201016351 A1 | 5/2010 |
| WO | WO 2007/069389 A1 | 6/2007 |

OTHER PUBLICATIONS

Taiwanese Office Action dated Jan. 23, 2014, (6 pgs.).

*Primary Examiner* — Peter F Godenschwager
(74) *Attorney, Agent, or Firm* — Foley & Lardner LLP (57) ABSTRACT

A negative electrode active material for an electric device includes an alloy containing silicon in a range from 33% by mass to 50% by mass, zinc in a range of greater than 0% by mass and less than or equal to 46% by mass exclusive, vanadium in a range from 21% by mass to 67% by mass, and inevitable impurities as a residue. The negative electrode active material can be obtained with a multi DC magnetron sputtering apparatus by use of, for example, silicon, zinc, and vanadium as targets. An electric device using the negative electrode active material can achieve long cycle life and ensure a high capacity and cycle durability.

6 Claims, 3 Drawing Sheets

NEGATIVE ELECTRODE ACTIVE MATERIAL FOR ELECTRIC DEVICE

TECHNICAL FIELD

The present invention relates to a negative electrode active material for an electric device generally serving as a secondary battery or a capacitor used as a driving power source of a motor for use in, for example, an electric vehicle (EV) or a hybrid electric vehicle (HEV).

BACKGROUND ART

Various measures for reduction of emissions of carbon dioxide ($CO_2$) are being taken in order to deal with atmospheric pollution and global warming. In particular, in the automobile industry, the reduction of emissions of $CO_2$ is highly expected in association with the spread of electric vehicles and hybrid electric vehicles. Thus, development of high-performance secondary batteries serving as driving power sources of motors for use in such vehicles, is actively being carried out.

For the secondary batteries serving as driving power sources of motors, a higher capacity and cycle property are particularly required. Thus, lithium ion secondary batteries having high theoretical energy are gaining increased attention among other types of secondary batteries. The lithium ion secondary batteries are required to store a large amount of electricity per unit mass in positive electrodes and negative electrodes, in order to increase energy density of the lithium ion secondary batteries. Therefore, the determination of active materials used in the respective electrodes is quite important so as to fulfill such a requirement.

There are known methods for manufacturing electrode materials used for lithium ion secondary batteries having a high discharge capacity per volume and a high charge-discharge cycle property (for example, refer to Patent Literature 1). In particular, Patent Literature 1 discloses a method for manufacturing an electrode material including composite particles having a predetermine average particle diameter and specific surface area obtained in a manner such that fine particles mainly including silicon, metal powder including predetermined elements such as tin and aluminum, and carbon powder are dry-milled. Patent Literature 1 also discloses that such an electrode thus obtained is used for a negative electrode for a lithium ion secondary battery.

CITATION LIST

Patent Literature

Patent Literature 1: Japanese Unexamined Patent Application Publication No. 2006-216277

SUMMARY OF INVENTION

However, in the lithium ion secondary battery using the electrode material for the negative electrode disclosed in Patent Literature 1, the electrode material shifts from an amorphous state to a crystalline state when silicon (Si) is alloyed with lithium (Li). As a result, the volume is greatly changed in association with the state shift at the point of alloying, which causes a reduction in cycle life of the electrode. In addition, when using the silicon active material, the capacity has a trade-off relationship with the cycle durability. Thus, there has been a strong demand for the development of active materials capable of ensuring a higher capacity and improved durability concurrently.

The present invention has been accomplished in view of the conventional problems. An object of the present invention is to provide a negative electrode active material for an electric device capable of suppressing amorphous-crystal phase transition so as to extend cycle life, and further ensuring a high capacity and cycle durability. Another object of the present invention is to provide a negative electrode and an electric device such as a lithium ion secondary battery including the negative electrode active material.

A negative electrode active material for an electric device according to an aspect of the present invention includes an alloy containing silicon in a range from 33% by mass to 50% by mass, zinc in a range of greater than 0% by mass and less than or equal to 46% by mass, vanadium in a range from 21% by mass to 67% by mass, and inevitable impurities as a residue.

DESCRIPTION OF EMBODIMENTS

A negative electrode active material for an electric device, a negative electrode for an electric device and an electric device will be explained in detail below. It should be noted that the symbol "%" represents a percentage by mass unless otherwise specified. In addition, dimensional ratios in the drawings are magnified for convenience of explanation and may be different from actual ratios.

[Negative Electrode Active Material for Electric Device]

The negative electrode active material for an electric device according to the present embodiment includes an alloy containing silicon (Si) with content in the range from 33% by mass to 50% by mass, zinc (Zn) with content in the range of greater than 0% by mass and less than or equal to 46% by mass, vanadium (V) with content in the range from 21% by mass to 67% by mass, and inevitable impurities as a residue. These numerical ranges correspond to the area indicated by reference numeral A in FIG. 1. This negative electrode active material is used in a negative electrode for an electric device such as a lithium ion secondary battery. In such a case, the alloy contained in the negative electrode active material absorbs lithium ions when the battery is charged, and releases the lithium ions when the battery is discharged.

In particular, the negative electrode active material for an electric device is a silicon series active material, which further contains zinc (Zn) as a first additive element and vanadium (V) as a second additive element. The first additive element of Zn and the second additive element of V selected appropriately can suppress amorphous-crystal phase transition so as to extend cycle life when the negative electrode active material is alloyed with lithium. Such an active material contributes to ensuring a higher capacity than carbon series negative electrode active materials. By optimizing the composition ranges of Zn and V as the first and second additive elements, the negative electrode active material containing the Si (Si—Zn—V series) alloy exhibiting good cycle life even after 50 cycles, can be obtained.

In the negative electrode active material containing the Si—Zn—V series alloy, if the content of silicon is less than 33% by mass, the content of vanadium is greater than 67% by mass, and no zinc is contained, a sufficient initial capacity of the battery may not be obtained. In addition, if the content of silicon is greater than 50% by mass, the content of vanadium is less than 21% by mass, and the content of zinc is greater than 46% by mass, good cycle life may not be ensured.

Figure 2:
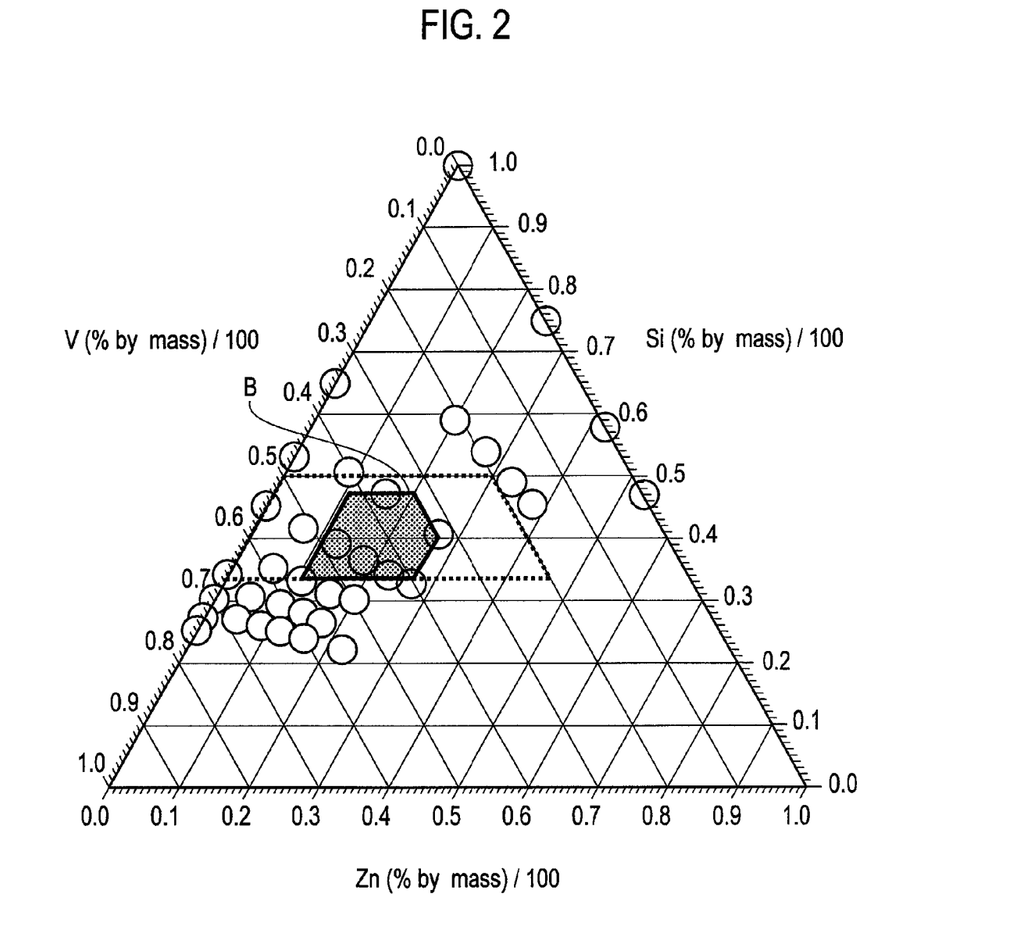
FIG. 2 is a ternary composition diagram showing a preferable composition range of the Si—Zn—V series alloy included in the negative electrode active material for an electric device according to the embodiment of the present invention.

In order to further improve these properties, the alloy preferably contains silicon with content in the range from 33% by mass to 47% by mass, zinc with content in the range from 11% by mass to 27% by mass, and vanadium with content in the range from 33% by mass to 56% by mass. These numerical ranges correspond to the area indicated by reference numeral B in FIG. 2.

Note that the alloy contained in the negative electrode active material according to the present embodiment inevitably contains impurities derived from the raw materials and the production method, in addition to the three compositions described above. The content of the inevitable impurities is preferably less than 0.5% by mass, more preferably less than 0.1% by mass.

As described above, the alloy included in the negative electrode active material according to the present embodiment contains: silicon with content in the range from 33% by mass to 50% by mass; zinc with content in the range of greater than 0% by mass and less than or equal to 46% by mass; vanadium with content in the range from 21% by mass to 67% by mass; and inevitable impurities as a residue. Namely, the alloy consists of: silicon with content in the range from 33% by mass to 50% by mass; zinc with content in the range of greater than 0% by mass and less than or equal to 46% by mass; vanadium with content in the range from 21% by mass to 67% by mass; and inevitable impurities as a residue.

The method for manufacturing the negative electrode active material according to the present embodiment, that is the Si—Zn—V series alloy having the above-described composition, is not particularly limited, and may be any conventionally known method. Namely, various conventional manufacturing methods may be used without any particular obstacle, since there is little difference in the conditions and characteristics of the alloy produced by the manufacturing methods. For example, the thin film alloy having the above-described composition may be obtained by a multi PVD method (a sputtering method, a resistance heating method, a laser ablation method), or by a multi CVD method (a chemical vapor-phase growth method).

The negative electrode can be obtained in a manner such that the alloyed thin film obtained by these methods is directly formed on a current collector. Therefore, the alloyed thin film contributes to simplification of the process. In addition, the alloyed thin film need not use other components, such as a binder and an electric conducting additive, composing a negative electrode active material layer other than the alloy. Therefore, the alloyed thin film as the negative electrode active material is simply used for the negative electrode. Accordingly, the alloyed thin film contributes to a higher capacity and energy density, which satisfy the level suitable for practical use in vehicles, and is desirable to examine electrochemical characteristics of the active material.

The method for manufacturing the alloyed thin film may use a multi DC magnetron sputtering apparatus, such as an independently controllable ternary DC magnetron sputtering apparatus. Such an apparatus can freely form the Si—Zn—V series alloyed thin film having various alloy compositions and thicknesses on the surface of the substrate (the current collector). For example, the ternary DC magnetron sputtering apparatus uses target 1 (Si), target 2 (Zn) and target 3 (V), fixes the sputtering time, and changes the power level of the DC power source to 185 W for silicon, in the range from 0 to 50 W for zinc, and in the range from 0 to 150 W for vanadium. Accordingly, ternary series alloy samples having various composition formulae can be obtained. Note that, since sputtering conditions depend on sputtering devices, it is preferable to estimate appropriate ranges of the sputtering conditions through preliminary tests for each sputtering device.

As described above, the negative electrode active material layer according to the present embodiment may use the Si—Zn—V series alloyed thin film. Alternatively, the negative electrode active material layer may be a layer containing particles of the Si—Zn—V series alloy as a main component. Examples of the method for manufacturing such an alloy in a particle state include a mechanical alloying method and an arc plasma melting method.

When the alloy in the particle state is used as the negative electrode active material, slurry is prepared first in a manner such that a binder, an electric conducting additive and a viscosity control solvent are added to the alloy particles. The slurry thus obtained is then applied to the current collector to form the negative electrode active material layer, so as to obtain the negative electrode. Such a process is superior in terms of mass production and practicality for actual battery electrodes.

When the alloy in the particle state is used as the negative electrode active material, the average particle diameter of the alloy is not particularly limited as long as it is substantially the same as that of conventional negative electrode active materials. Here, the average particle diameter is preferably in the range from 1 μm to 20 μm in view of higher output power; however, the average particle diameter may be excluded in this range as long as it can achieve the effects described above appropriately.

Note that, in the description of the present invention, "the particle diameter" represents the greatest length between any two points on the circumference of the active material particle (the observed plane) observed by observation means such as a scanning electron microscope (SEM) or a transmission electron microscope (TEM). In addition, "the average particle diameter" represents a value calculated with a scanning electron microscope (SEM) or a transmission electron microscope (TEM) as an average value of particle diameters of the particles observed in several to several tens of fields of view. Particle diameters and average particle diameters of other constituents may be determined in the same manner.

[Negative Electrode for Electric Device and Electric Device]

Figure 3:
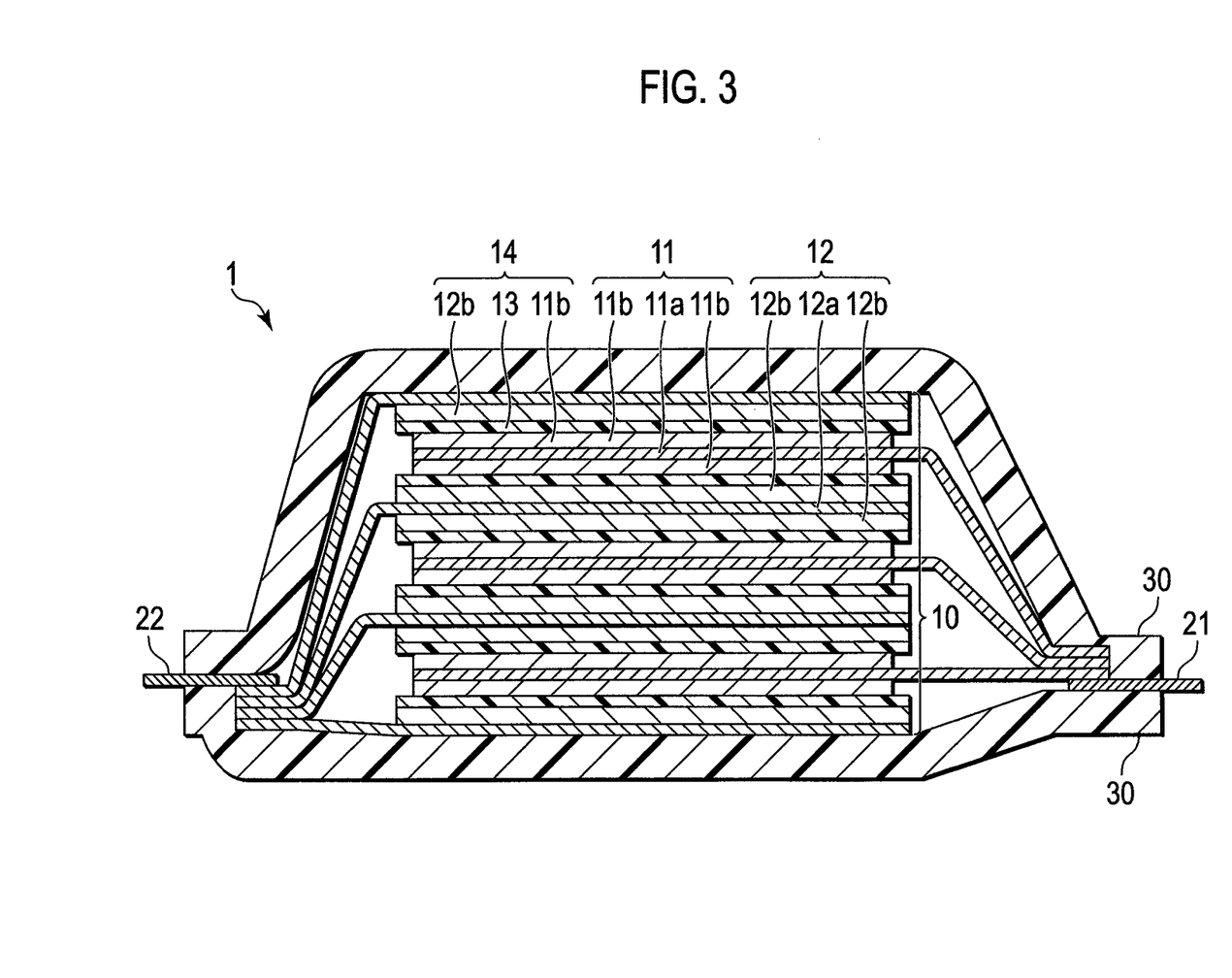
FIG. 3 is a schematic cross-sectional view showing an example of a lithium ion secondary battery according to the embodiment of the present invention.

The negative electrode for an electric device according to the embodiment of the present invention includes the negative electrode active material containing the Si—Zn—V series alloy. Representative examples of the electric device include a lithium ion secondary battery and an electrical double layer capacitor. The lithium ion secondary battery generally has a configuration, as shown in FIG. 3, in which positive electrodes 11 each including a positive electrode active material and the like applied to a positive electrode current collector and negative electrodes 12 each including a negative electrode active material and the like applied to a negative electrode current collector, are connected to each other via electrolyte layers 13, and these are stored in an exterior body. Hereinafter, the constitution of the lithium ion secondary battery and the materials used therein are explained in detail.

(Positive Electrode)

In the lithium ion secondary battery 1 according to the present embodiment, the positive electrode 11 has a structure in which positive electrode active material layers 11b are formed on both surfaces of a positive electrode current collector 11a.

The positive electrode current collector 11a is preferably made of an electrically conductive material such as an aluminum foil, a copper foil, a nickel foil and a stainless foil. The thickness of the positive electrode current collector 11a is not particularly limited, but is generally preferably in the range from 1 μm to 30 μm.

Each positive electrode active material layer 11b contains a positive electrode active material, and further contains an electric conducting additive and a binder as necessary. The content ratio of the positive electrode active material, the electric conducting additive and the binder in the positive electrode active material layer 11b, is not particularly limited.

Examples of the positive electrode active material include a lithium-transition metal composite oxide, a lithium-transition metal phosphate compound, a lithium-transition metal sulfated compound, a solid solution series material, a ternary series material, an NiMn series material, an NiCo series material, and a spinel-manganese series material.

Examples of the lithium-transition metal composite oxide include $LiMn_2O_4$, $LiCoO_2$, $LiNiO_2$, $Li(Ni, Mn, Co)O_2$, $Li(Li, Ni, Mn, Co)O_2$, $LiFePO_4$, and an oxide in which part of the transition metal contained in each of these composite oxides is substituted with other elements. The lithium-transition metal phosphate compound may be $LiFePO_4$. The lithium-transition metal sulfated compound may be $Li_xFe_2(SO_4)_3$. Examples of the solid solution series material include $xLiMO_2 \cdot (1-x)Li_2NO_3$ (wherein $0<x<1$, M represents at least one transition metal element in an average oxidation state of 3+, and N represents at least one transition metal element in an average oxidation state of 4×), and $LiRO_2$—$LiMn_2O_4$ (wherein R represents a transition metal element such as Ni, Mn, Co and Fe). The ternary series material may be a nickel-cobalt-manganese composite positive electrode material. The spinel manganese series material may be $LiMn_2O_4$. The NiMn series material may be $LiNi_{0.5}Mn_{1.5}O_4$. The NiCo series material may be $Li(NiCo)O_2$. Two or more kinds of the positive electrode active materials may be combined together according to circumstances. In view of having higher capacity and better output performance, the lithium-transition metal composite oxide is preferably used for the positive electrode active material.

The particle diameter of the positive electrode active material is not particularly limited; however, it is generally preferably as small as possible. In view of operation efficiency and ease of handling, the average particle diameter of the positive electrode active material may be approximately in the range from 1 μm to 30 μm, more preferably approximately in the range from 5 μm to 20 μm. Other positive electrode active materials having average particle diameters other than the above-described range may be used. In the case that the active materials require different particle diameters in order to achieve their own appropriate effects, the active materials having different particle diameters may be selected and mixed together so as to optimally function to achieve their own effects. Thus, it is not necessary to equalize the particle diameter of all of the active materials.

The binder in the positive electrode active material layer 11b is added to bind the active materials to each other or bind the active material to the positive electrode current collector 11a to maintain the electrode structure. The binder may be thermoplastic resin such as polyvinylidene fluoride (PVDF), polytetrafluoroethylene (PTFE), polyvinyl acetate, polyimide (PI), polyamide (PA), polyvinyl chloride (PVC), polymethyl acrylate (PMA), polymethyl methacrylate (PMMA), polyether nitrile (PEN), polyethylene (PE), polypropylene (PP), and polyacrylonitrile (PAN). Alternatively, thermosetting resin such as epoxy resin, polyurethane resin, and urea resin, or a rubber material such as styrene-butadiene rubber (SBR), may be used for the binder.

The electric conducting additive in the positive electrode active material layer 11b is also referred to as an electric conducting agent added to improve electric conductivity. The electric conducting additive used in the present embodiment is not particularly limited, and a conventionally known agent may be used. The electric conducting additive may be a carbon material such as carbon black (such as acetylene black), graphite, and carbon fiber. The addition of the electric conducting additive contributes to effectively establishing an electronic network in the active material layer, thereby improving output performance and battery reliability due to improvement in retention of an electrolyte solution.

(Negative Electrode)

The negative electrode 12 has a configuration, as in the case of the positive electrode, in which negative electrode active material layers 12b are formed on both surfaces of a negative electrode current collector 12a. The negative electrode current collector 12a is preferably made from, as in the case of the positive electrode current collector 11a, an electrically conductive material such as an aluminum foil, a copper foil, a nickel foil and a stainless foil. The thickness of the negative electrode current collector 12a is preferably approximately in the range from 1 μm to 30 μm, as in the case of the positive electrode current collector 11a.

As described above, the negative electrode active material according to the present embodiment contains the Si—Zn—V series alloy having the above-described composition as an essential component. The negative electrode active material layer 12b according to the present embodiment may be a thin film including the Si—Zn—V series alloy. In this case, the negative electrode active material layer may consist of the Si—Zn—V series alloy, or may further contain other negative electrode active materials described below.

Alternatively, as described above, the negative electrode active material layer 12b may contain, as a main component, the particles of the Si—Zn—V series alloy. In this case, the negative electrode active material layer 12b may contain the electric conducting additive and the binder as necessary, which the positive electrode active material layer 11b may also contain. Note that, in the present description, "the main component" represents a component contained in the negative electrode active material layer 12b with content of greater than or equal to 50% by mass.

The lithium ion secondary battery as the electric device according to the present embodiment includes the negative electrode active material containing the Si—Zn—V series alloy having the above-described composition. However, a conventionally known negative electrode active material capable of reversibly absorbing and releasing lithium may be used together without any particular obstacle as long as the negative electrode active material containing the above-described alloy is included as an essential component.

The other negative electrode active material used together may be a carbon material such as graphite that is highly crystalline carbon (such as natural graphite and artificial graphite), low crystalline carbon (such as soft carbon and hard carbon), carbon black (such as Ketjenblack (registered trademark), acetylene black, channel black, lamp black, oil furnace black, and thermal black), fullerene, carbon nanotube, carbon nanofiber, carbon nanohorn, and carbon fibril. Examples of the negative electrode active material further include a single substance alloyed with lithium such as Si, Ge, Sn, Pb, Al, In, Zn, H, Ca, Sr, Ba, Ru, Rh, Jr, Pd, Pt, Ag, Au, Cd, Hg, Ga, Tl, C, N, Sb, Bi, O, S, Se, Te, and Cl, and an oxide and a carbide containing the elements listed above. Examples of the oxide include silicon monoxide (SiO), $SiO_x$ (0<x<2), tin dioxide ($SnO_2$), $SnO_x$ (0<x<2), and $SnSiO_3$. The carbide may be silicon carbide (SiC). Other examples of the negative electrode active material include a metallic material such as lithium metal, and a lithium-transition metal composite oxide such as a lithium-titanium composite oxide (lithium titanate: $Li_4Ti_5O_{12}$).

The negative electrode 12 may be obtained in a manner such that slurry containing the negative electrode active material together with the electric conducting additive and the binder, is applied to the surface of the negative electrode current collector 12a to form the negative electrode active material layer 12b. Alternatively, the negative electrode 12 may be obtained in a manner such that a thin film of the negative electrode active material alloy is directly formed on the surface of the negative electrode current collector 12a by a multi PVD method or a multi CVD method.

As described above, the positive electrode active material layer and the negative electrode active material layer are each provided on one side or both sides of the respective current collectors. Alternatively, one current collector may be provided with the positive electrode active material layer on one side, and provided with the negative electrode active material layer on the other side. Electrodes having such a configuration are used for a bipolar battery.

(Electrolyte Layer)

The electrolyte layer 13 contains a non-aqueous electrolyte that functions as a carrier of lithium ions that move between the positive electrode and the negative electrode at the time of charging and discharging. The thickness of the electrolyte layer 13 is preferably reduced as much as possible so as to reduce internal resistance. The thickness is generally approximately in the range from 1 μm to 100 μm, preferably in the range from 5 μm to 50 μm.

The non-aqueous electrolyte contained in the electrolyte layer 13 is not particularly limited as long as it functions as a carrier of lithium ions, and may be a liquid electrolyte or a polymer electrolyte.

The liquid electrolyte has a constitution in which lithium salts (electrolyte salts) are dissolved in an organic solvent. The organic solvent may be carbonate such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and methyl propyl carbonate (MPC). The lithium salts may be a compound that can be added to the electrode active material layers, such as $Li(CF_3SO_2)_2N$, $Li(C_2F_5SO_2)_2N$, $LiPF_6$, $LiBF_4$, $LiAsF_6$, $LiTaF_6$, $LiClO_4$, and $LiCF_3SO_3$.

The polymer electrolyte is divided into two types; a gel polymer electrolyte (a gel electrolyte) containing an electrolysis solution, and an intrinsic polymer electrolyte not containing an electrolysis solution.

The gel polymer electrolyte preferably has a constitution in which the liquid electrolyte is poured into a matrix polymer (a host polymer) including an ion conductive polymer. The use of the gel polymer electrolyte decreases fluidity of the electrolyte so as to easily interrupt ion conduction between the respective layers. The ion conductive polymer used as the matrix polymer (the host polymer) is not particularly limited, and examples thereof include polyethylene oxide (PEO), polypropylene oxide (PPO), polyvinylidene fluoride (PVDF), a copolymer of polyvinylidene fluoride and hexafluoropropylene (PVDF-HFP), polyethylene glycol (PEG), polyacrylonitrile (PAN), polymethyl methacrylate (PMMA), and a copolymer of these compounds.

The ion conductive polymer may be the same as, or different from, an ion conductive polymer used as the electrolyte in the active material layers, but it is preferably the same. The electrolysis solution (namely, the lithium salts and the organic solvent) is not particularly limited, and may employ the electrolyte salts such as lithium salts and the organic solvent such as carbonate as described above.

The intrinsic polymer electrolyte has a constitution in which lithium salts are dissolved in the matrix polymer, but no organic solvent is contained. Thus, the use of the intrinsic polymer electrolyte contributes to reducing the risk of liquid leakage from the battery and thereby enhancing the reliability of the battery.

The matrix polymer of the gel polymer electrolyte or the intrinsic polymer electrolyte can exhibit high mechanical strength when a cross-linked structure is formed. The cross-linked structure may be formed in a manner such that a polymerizable polymer used for polymer electrolyte formation (for example, PEO and PPO) is subjected to polymerization by use of an appropriate polymerization initiator. Examples of the polymerization include thermal polymerization, ultraviolet polymerization, radiation polymerization, and electron beam polymerization. The non-aqueous electrolyte contained in the electrolyte layer 13 may be used singly, or two or more kinds thereof may be mixed.

A separator is preferably used in the electrolyte layer 13 when the electrolyte layer 13 contains the liquid electrolyte or the gel polymer electrolyte. The specific configuration of the separator may be a microporous film made from polyolefin such as polyethylene and polypropylene.

(Positive Electrode Tab and Negative Electrode Tab)

As shown in FIG. 3, the lithium ion secondary battery 1 according to the present embodiment has a constitution in which a battery member 10 to which a positive electrode tab 21 and a negative electrode tab 22 are attached, is sealed in an exterior body 30. In the present embodiment, the positive electrode tab 21 and the negative electrode tab 22 are exposed on opposite sides on the outside of the exterior body 30. Note that the positive electrode tab and the negative electrode tab may be exposed on the same side on the outside of the exterior body (not shown in the figure). In addition, the positive electrode tab and the negative electrode tab may be attached to the positive electrode current collectors 11a and the negative electrode current collectors 12a by, for example, ultrasonic welding or resistance welding.

The positive electrode tab 21 and the negative electrode tab 22 are made from a material such as aluminum, copper, titanium, nickel, stainless steel (SUS), or an alloy thereof. However, the material is not limited to these, and may be any conventionally known material used for tabs for lithium ion secondary batteries.

The positive electrode tab 21 and the negative electrode tab 22 may be made from the same material, or may be made from different materials. The tabs may be prepared preliminarily and connected to the positive electrode current collectors 11a and the negative electrode current collectors 12a according to the present embodiment. Alternatively, each of the positive electrode current collectors 11a and the negative electrode current collectors 12a may be extended to form the respective tabs. Each part of the positive electrode tab 21 and the negative electrode tab 22 exposed on the outside of the exterior body 30 is preferably covered with, for example, a heat shrinkable tube having a heat resistant and insulating property (not shown in the figure). This reduces the chances of any negative influence on surrounding products (such as components in a vehicle, in particular, electronic devices) caused by a short circuit because of contact of the positive electrode tab 21 and the negative electrode tab 22 with peripheral devices or wires.

In addition, current collecting plates may be used to extract a current outside of the battery. Such current collecting plates are electrically connected to the current collectors and leads, and exposed on the outside of the exterior body 30. The material constituting the current collecting plates is not particularly limited, and may be a highly electrically conductive material conventionally used for current collecting plates for lithium ion secondary batteries. For example, the constituent material for the current collecting plates is preferably a metallic material such as aluminum, copper, titanium, nickel, stainless steel (SUS), or an alloy thereof, more preferably aluminum or copper in view of lightness, corrosion resistance and high electric conductivity. The positive electrode current collecting plates and the negative electrode current collecting plates may be made from the same material, or may be made from different materials.

(Exterior Body)

The exterior body 30 is preferably made from a film-like exterior material in view of, for example, reduction in size and weight. However, the exterior body 30 is not limited to such a material, and may be a conventionally known material used for exterior bodies for lithium ion secondary batteries. Namely, a metal can casing may be used.

In order that the lithium ion secondary battery can have high output power and cooling performance and can be suitably used as a battery for large devices such as electric vehicles and hybrid electric vehicles, a polymer-metal composite laminated sheet having high thermal conductivity may be used. In particular, an exterior body made from an exterior material such as a laminated film having a three-layer structure in which PP, aluminum, and nylon are laminated in this order, may be used.

(Battery Configuration)

As described above, the lithium ion secondary battery according to the present embodiment includes the battery member 10 in which the plural battery elements (the electrode structures) 14 each including the positive electrode and the negative electrode connected to each other via the electrolyte layer, are stacked on top of each other. The lithium ion secondary battery has a structure in which the battery member 10 is housed in the exterior body such as a can body or a laminated container.

The lithium ion secondary battery is mainly divided into two types: a wound type battery having a structure in which positive electrodes 11, electrolyte layers 13 and negative electrodes 12 are wound, and a stacking type battery having a structure in which positive electrodes 11, electrolyte layers 13 and negative electrodes 12 are stacked. The battery shown in FIG. 3 and bipolar batteries have a structure corresponding to the stacking type battery. The lithium ion secondary battery is also referred to as a coin cell, a button battery or a laminated battery depending on the shape and structure of the battery casing.

EXAMPLES

Hereinafter, the present invention is explained in more detail with reference to Examples and Comparative Examples; however, the present invention is not limited to these examples.

[1] Preparation of Negative Electrode

As a sputtering apparatus, an independently controllable ternary DC magnetron sputtering apparatus (manufactured by Yamato-Kiki Industrial Co., Ltd.; combinatorial sputter coating apparatus; gun-sample distance: about 100 mm) was used. Thin films of negative electrode active material alloys having compositions according to the respective examples were formed on a substrate (a current collector) made of a nickel foil having a thickness of 20 μm using this apparatus under the following target and film formation conditions. Accordingly, 31 samples of negative electrodes each including the thin film of the negative electrode active material alloy thus obtained having a composition of each example shown in Table 1, were prepared.

(1) Targets (Manufactured by Kojundo Chemical Laboratory Co., Ltd.; Purity: 4N)

Si: diameter of 50.8 mm; thickness of 3 mm (with backing plate of oxygen-free copper with thickness of 2 mm)

Zn: diameter of 50.8 mm; thickness of 5 mm

V: diameter of 50.8 mm; thickness of 5 mm (2) Conditions of Film Formation

Base pressure: up to $7 \times 10^{-6}$ Pa

Sputtering gas: Ar (99.9999% or more)

Sputtering gas introduction amount: 10 sccm

Sputtering pressure: 30 mTorr

DC power source: silicon (185 W), zinc (0 to 50 W), vanadium (0 to 150 W)

Pre-sputtering time: 1 min.

Sputtering time: 10 min.

Substrate temperature: room temperature (25° C.)

Figure 1:
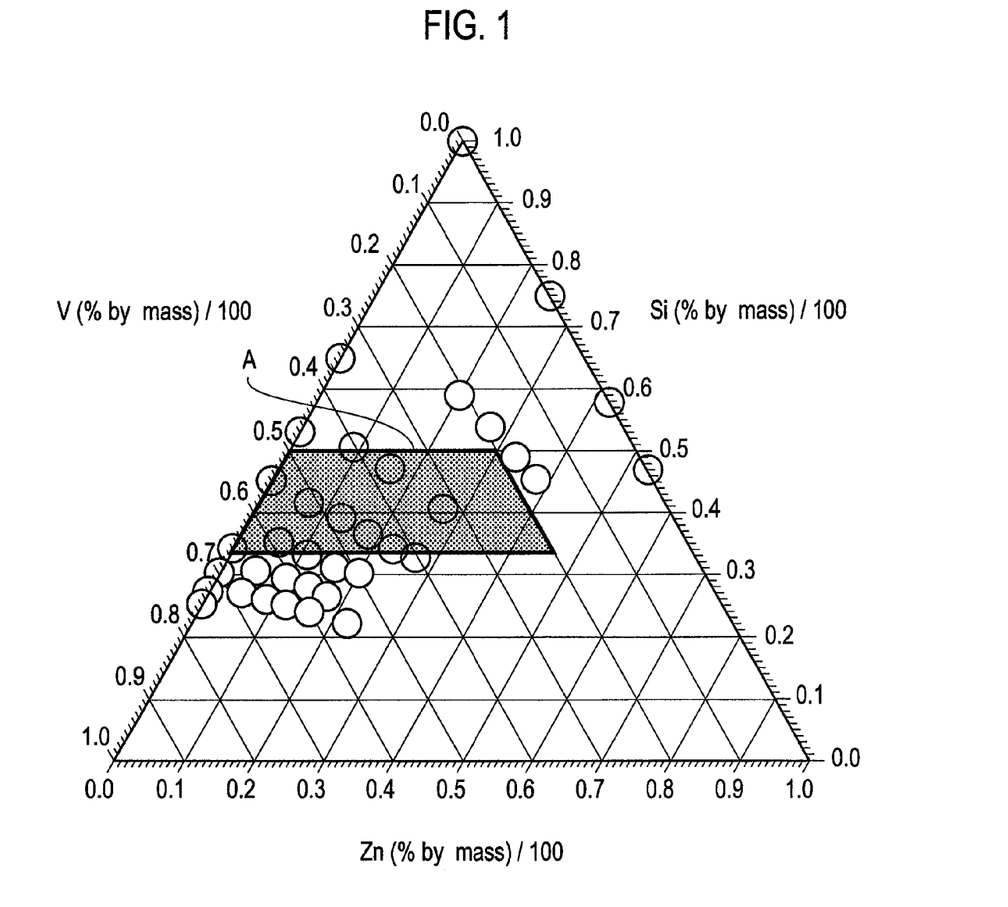
FIG. 1 is a ternary composition diagram showing a composition range of a Si—Zn—V series alloy included in a negative electrode active material for an electric device according to an embodiment of the present invention, wherein alloy compositions prepared in each example are plotted.

Namely, in each example, the Si target, the Zn target and the V target were used, the fixed sputtering time was set to 10 minutes, and the power levels of the DC power source were changed for each target within the above-described ranges. Then, the alloyed thin films in an amorphous state were formed on Ni substrates, so as to obtain the negative electrode samples for each example including the alloyed thin films having various compositions. Table 1 and FIG. 1 show the element compositions of these alloyed thin films.

As for the sample preparation, for example, in Sample No. 22 (Example), the DC power source 1 (Si target) was set to 185 W, the DC power source 2 (Zn target) was set to 40 W, and the DC power source 3 (V target) was set to 75 W. In Sample No. 30 (Comparative Example), the DC power source 1 (Si target) was set to 185 W, the DC power source 2 (Zn target) was set to 0 W, and the DC power source 3 (V target) was set to 80 W. In Sample No. 35 (Comparative Example), the DC power source 1 (Si target) was set to 185 W, the DC power source 2 (Zn target) was set to 42 W, and the DC power source 3 (V target) was set to 0 W.

The obtained alloyed thin films were analyzed by using the following analysis method and analysis device:

Composition analysis: SEM-EDX analysis (manufactured by JEOL Ltd.), EPMA analysis (manufactured by JEOL Ltd.)

Film thickness measurement (for calculating sputtering rate): film thickness meter (manufactured by Tokyo Instruments, Inc.)

Film state analysis: Raman spectroscopic analysis (manufactured by Bruker Corporation)

[2] Preparation of Batteries

Each negative electrode sample obtained as described above was placed to face the counter electrode (the positive electrode) made of a lithium foil via a separator, and an electrolysis solution was poured therein, so as to prepare a CR2032 type coin cell prescribed in IEC60086 for each example. The lithium foil was a lithium foil (manufactured by Honjo Metal Co., Ltd.) cut out in a manner as to have a diameter of 15 mm and a thickness of 200 μm. The separator was Celgard 2400 (manufactured by Celgard, LLC.). The electrolysis solution used was prepared in a manner such that $LiPF_6$ (lithium hexafluorophosphate) was dissolved, at a concentration of 1 M, into a mixed non-aqueous solvent in which ethylene carbonate (EC) and diethyl carbonate (DEC) were mixed in a ratio of 1:1.

[3] Charge-Discharge Test of Batteries

The following charge-discharge test was performed on the respective cells obtained as described above. That is, the respective cells were charged and discharged by using a charge-discharge tester in a thermostat bath set at 300 K (27° C.). The charge-discharge tester used was HJ0501SM8A (manufactured by Hokuto Denko Corporation), and the thermostat bath used was PFU-3K (manufactured by ESPEC Corp.).

Each cell was charged at 0.1 mA from 10 mV to 2V at the constant current/constant voltage mode during charging, that is, in the process of Li intercalation to the negative electrode. After that, each cell was discharged at 0.1 mA from 2 V to 10 mV at the constant current mode during discharge, that is, in the process of Li release from the negative electrode. This charge-discharge procedure can be regarded as a single charge-discharge cycle. A charge-discharge test was carried out by repeating the above-described charge-discharge cycle 50 times, so as to obtain discharge capacities at the 1st cycle and the 50th cycle. Table 1 shows the results thus obtained. Note that, in Table 1, "Discharging capacity maintenance ratio (%) at 50th cycle" represents a ratio of the discharging capacity at the 50th cycle to the discharging capacity at the 1st cycle ((discharging capacity at 50th cycle)/(discharging capacity at 1st cycle)×100). The charge-discharging capacity was calculated per alloy weight.

TABLE 1

| No. | Negative Electrode Active Material Component (%) | | | 1st Cycle Discharge Capacity (mAh/g) | 50th Cycle | | Classification |
| | Si | Zn | V | | Discharge Capacity (mAh/g) | Discharge Capacity Maintenance Ratio (%) | |
| --- | --- | --- | --- | --- | --- | --- | --- |
| 1 | 41 | 8 | 51 | 1075 | 986 | 89 | Example |
| 2 | 31 | 5 | 64 | 697 | 648 | 90 | Comparative Example |
| 3 | 59 | 20 | 21 | 1662 | 1378 | 82 | Comparative Example |
| 4 | 39 | 13 | 48 | 1019 | 962 | 91 | Example |
| 5 | 29 | 10 | 61 | 676 | 658 | 93 | Comparative Example |
| 6 | 54 | 27 | 19 | 1467 | 1311 | 87 | Comparative Example |
| 7 | 37 | 18 | 45 | 989 | 952 | 93 | Example |
| 8 | 28 | 14 | 59 | 687 | 691 | 95 | Comparative Example |
| 9 | 49 | 33 | 18 | 1405 | 1252 | 87 | Comparative Example |
| 10 | 34 | 23 | 43 | 912 | 885 | 93 | Example |
| 11 | 27 | 17 | 56 | 632 | 653 | 96 | Comparative Example |
| 12 | 46 | 37 | 17 | 1261 | 1112 | 84 | Comparative Example |
| 13 | 33 | 27 | 40 | 862 | 836 | 93 | Example |
| 14 | 51 | 9 | 40 | 1413 | 1178 | 81 | Comparative Example |
| 15 | 35 | 6 | 59 | 841 | 815 | 93 | Example |
| 16 | 27 | 5 | 68 | 570 | 542 | 90 | Comparative Example |
| 17 | 47 | 16 | 37 | 1245 | 1148 | 90 | Example |
| 18 | 33 | 11 | 56 | 821 | 782 | 93 | Example |
| 19 | 26 | 9 | 65 | 532 | 541 | 95 | Comparative Example |
| 20 | 31 | 16 | 53 | 746 | 765 | 94 | Comparative Example |
| 21 | 25 | 12 | 63 | 566 | 576 | 94 | Comparative Example |
| 22 | 41 | 27 | 32 | 1079 | 1045 | 93 | Example |
| 23 | 30 | 20 | 50 | 699 | 718 | 94 | Comparative Example |
| 24 | 24 | 16 | 60 | 530 | 567 | 97 | Comparative Example |
| 25 | 22 | 22 | 56 | 481 | 492 | 93 | Comparative Example |
| 26 | 100 | 0 | 0 | 3232 | 1529 | 47 | Comparative Example |
| 27 | 65 | 0 | 35 | 1451 | 1241 | 85 | Comparative Example |
| 28 | 53 | 0 | 47 | 1182 | 1005 | 85 | Comparative Example |
| 29 | 45 | 0 | 55 | 986 | 824 | 83 | Comparative Example |
| 30 | 34 | 0 | 66 | 645 | 589 | 90 | Comparative Example |
| 31 | 30 | 0 | 70 | 564 | 510 | 88 | Comparative Example |
| 32 | 27 | 0 | 73 | 459 | 422 | 86 | Comparative Example |
| 33 | 25 | 0 | 75 | 366 | 345 | 86 | Comparative Example |
| 34 | 75 | 25 | 0 | 2294 | 1742 | 76 | Comparative Example |
| 35 | 58 | 42 | 0 | 1625 | 1142 | 70 | Comparative Example |
| 36 | 47 | 53 | 0 | 1302 | 961 | 74 | Comparative Example |

The test result revealed that the batteries using the Si—Zn—V series alloy, as the negative electrode active material, containing Si with content in the range from 33% by mass to 50% by mass, Zn with content in the range of greater than 0% by mass and less than or equal to 46% by mass, and V with content in the range from 21% by mass to 67% by mass, achieved a better balance between the initial capacity and the cycle property. Namely, the batteries No. 1, 4, 7, 10, 13, 15, 17, 18, and 20 corresponding to Examples show an initial capacity of greater than 800 mA/g and a discharge capacity maintenance ratio of greater than or equal to 89%, and achieve a better balance between the initial capacity and the cycle property.

The entire content of Japanese Patent Application No. P2011-116671 (filed on May 25, 2011) is herein incorporated by reference.

Although the present invention has been described above by reference to the examples, the present invention is not limited to the descriptions thereof, and it will be apparent to those skilled in the art that various modifications and improvements can be made.

INDUSTRIAL APPLICABILITY

The present invention uses, as the negative electrode active material for an electric device, the Si—Zn—V series ternary alloy. Accordingly, the electric device such as a lithium ion secondary battery employing the negative electrode active material, contributes to achieving long cycle life and ensuring a high capacity and cycle durability.

REFERENCE SIGNS LIST

1 Lithium ion secondary battery
10 Battery member
11 Positive electrode
12 Negative electrode
12*a* Negative electrode current collector
12*b* Negative electrode active material layer
13 Electrolyte layer
30 Exterior body

The invention claimed is:

1. A negative electrode active material for a lithium ion secondary battery, comprising: an alloy containing silicon in a range from 33% by mass to 50% by mass, zinc in a range from 6% by mass to 46% by mass, vanadium in a range from 21% by mass to 67% by mass.

2. The negative electrode active material for a lithium ion secondary battery according to claim 1, wherein the alloy contains silicon in the range from 33% by mass to 47% by mass, zinc in the range from 11% by mass to 27% by mass, and vanadium in the range from 33% by mass to 56% by mass.

3. A negative electrode for a lithium ion secondary battery, comprising: the negative electrode active material according to claim 1.

4. A lithium ion secondary battery comprising: the negative electrode active material according to claim 1.

5. A lithium ion secondary battery comprising: the negative electrode according to claim 3.

6. The negative electrode active material for a lithium ion secondary battery according to claim 1, wherein a total mass ratio of silicon, zinc and vanadium is 100%.

* * * * *